United States Patent [19]

Cornu et al.

[11] Patent Number: 4,978,211
[45] Date of Patent: Dec. 18, 1990

[54] LARGE DIAMETER POSITIVE POWER OPHTHALMIC LENS

[75] Inventors: Daniel Cornu; Christian Harsigny, both of Yerres; Jean Thiebaut, Paris, all of France

[73] Assignee: Essilor International Cie Generale d'Optique, Creteil Cedex, France

[21] Appl. No.: 419,536

[22] Filed: Oct. 10, 1989

[30] Foreign Application Priority Data

Oct. 20, 1988 [FR] France ................... 88 13772

[51] Int. Cl.$^5$ .................. G02C 7/02; G02B 13/18
[52] U.S. Cl. ..................... 351/159; 350/432
[58] Field of Search ............. 351/159; 350/432-435

[56] References Cited

U.S. PATENT DOCUMENTS

| | | | |
|---|---|---|---|
| 3,960,442 | 6/1976 | Davis et al. | 351/159 X |
| 4,239,353 | 12/1980 | Koller | 351/160 H |
| 4,289,387 | 9/1981 | Jalie | 351/159 |

FOREIGN PATENT DOCUMENTS

| | | |
|---|---|---|
| 0201231 | 11/1986 | European Pat. Off. . |
| 2749144 | 4/1974 | Fed. Rep. of Germany . |
| 2132785 | 7/1984 | United Kingdom . |
| 2139375 | 11/1984 | United Kingdom . |
| 8602462 | 4/1986 | World Int. Prop. O. . |

*Primary Examiner*—Scott J. Sugarman
*Attorney, Agent, or Firm*—Charles E. Brown; Charles A. Brown

[57] ABSTRACT

A positive power ophthalmic lens has a central optically active area the diameter of which is at most equal to the diameter of its geometrical contour. It has an optional peripheral merging area around the central optically active area, between the latter and the geometrical contour. The diameter $D_1$ in millimeters of the central optically active area is related to the power P of the lens in diopters by a general equation of the type:

$$D_1 = a - b.p$$

where a is a numerical parameter taking a value between 84 and 89 and b is a numerical parameter taking a value between 4 and 4.9. This equation makes it possible to obtain well corrected positive power ophthalmic lenses with a large diameter that are relatively light in weight.

5 Claims, 1 Drawing Sheet

LARGE DIAMETER POSITIVE POWER OPHTHALMIC LENS

BACKGROUND OF THE INVENTION

1. Field of the invention

The present invention concerns positive power ophthalmic lenses and more particularly lenses of this kind in which the power is relatively moderate, for example in the order of 2 to 9 diopters.

2. Description of the prior art

A positive power ophthalmic lens has to satisfy numerous requirements.

The first and most important is that it should have a central optically active area as large as possible, it being understood that in this context there is meant by "optically active area", in the usual way, an area in which astigmatism and field curvature aberrations are sufficiently well corrected to provide satisfactory vision.

This optically active area generally covers all of the lens, its limited and constant diameter irrespective of the power of the lens being then equal to that of the geometrical contour of the lens.

In the case of a high positive power lens a peripheral merging area is provided around the optically active area, between it and the geometrical contour of the lens.

A second requirement is that the thickness at the edge of the lens should have a particular value, among other reasons for mechanical strength and to enable fitting to a frame.

However, a third requirement that is just as important as the previous two is that the thickness at the center of the lens should be as small as possible to ensure wearer comfort, and in particular that the lens has minimal weight.

These usual requirements relate to the geometry of the lens and its optical characteristics. They are usually complemented by an industrial requirement relating to the fact that for simple economic reasons it is desirable that the lenses be easy to manufacture directly by molding any appropriate synthetic material such as diglycol allyl carbonate, for example.

Currently, however, to meet user expectations it is conjointly desirable for the diameter of the geometrical contour of the lens to be as large as possible, for mounting in large frames, that is to say frames with large rings or surrounds.

Currently lenses with a diameter exceeding 70 mm are required to equip certain frames.

This requirement is contradictory with the previous requirements, however, or at least with those relating to the geometry of the lens and its optical characteristics, even for moderate powers.

In fact, it is not currently possible to fit large frames with moderate positive power ophthalmic lenses.

This applies equally to lenses in which both surfaces are part-spherical and lenses with at least one aspherical surface.

There is therefore at this time some demand for positive power ophthalmic lenses which are of large diameter, well corrected and relatively light in weight.

The present invention is based on the new discovery that by adhering to a certain relationship between the diameter of the optically active area of the lens and its power it is possible to arrive at a compromise satisfying all these requirements and therefore meeting the aforementioned demand.

SUMMARY OF THE INVENTION

The present invention consists in a positive power ophthalmic lens having a central optically active area the diameter of which is at most equal to the diameter of its geometrical contour and an optional peripheral merging area around said optically active area and between it and said geometrical contour, in which lens the diameter $D_1$ in millimeters of said central optically active area is related to the power P of the lens in diopters by a general equation of the type:

$$D_1 = a - b.P$$

where a is a numerical parameter taking a value between 84 and 89 and b is a numerical parameter taking a value between 4 and 4.9.

Experience shows that by adhering to this equation it is possible to obtain a positive power ophthalmic lens which is well corrected in its optically active area, of large size, with in practise a geometrical contour considerably greater than 70 mm in diameter, and relatively light in weight.

Characteristics and advantages of the invention will emerge from the following description given by way of non-limiting example only with reference to the appended diagrammatic drawings.

DESCRIPTION OF THE PREFERRED EMBODIMENT

This ophthalmic lens in accordance with the invention has a positive power P between 2 and 9 diopters. It has a central optically active area 10 the diameter $D_1$ of which is at most equal to diameter $D_2$ of its geometrical contour 11. Although this is optional, in the embodiment shown it has around this optically active area 10, between the latter and said geometrical contour 11, a peripheral merging area 12.

In accordance with the invention the diameter $D_1$ in millimeters of the optically active area 10 is related to the power P in diopters by a general equation of the type:

$$D_1 = a - b.P$$

where a is a numerical parameter taking a value between 84 and 89 and b is a numerical parameter taking a value between 4 and 4.9.

Particularly satisfactory results are obtained when $a = 86.5$ and $b = 4.4$.

Figure 3:
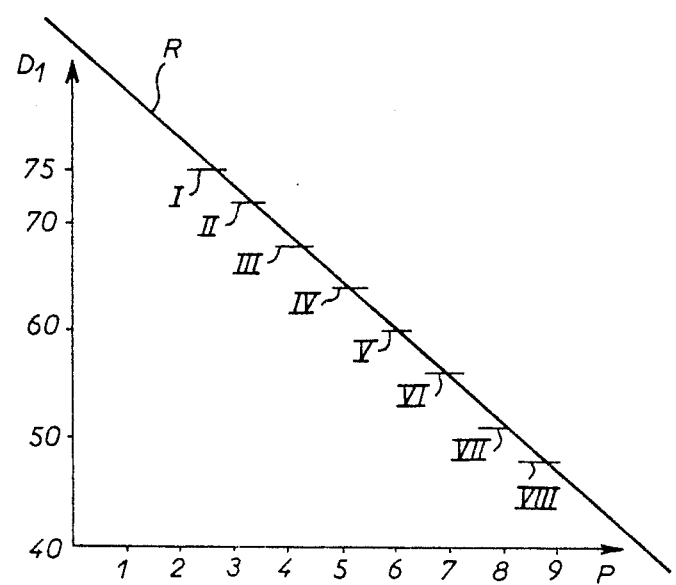
FIG. 3 is a diagram representing the equation that the lens satisfies.

In the FIG. 3 diagram the power P is plotted on the horizontal axis and the diameter $D_1$ is plotted on the vertical axis. The straight line R represents the equation in accordance with the invention.

The front surface 13 of the ophthalmic lens in accordance with the invention, which comprises the front surface 14 of its optically active area 10 and the front surface 15 of its merging area 12, is a surface of revolution about the optical and geometrical axis. The same goes for its rear surface 16.

The front surface 14 of the optically active area 10 is aspherical.

It has been found that good results are obtained if this aspherical surface conforms to the following Cartesian equation:

TABLE T1

| EXAMPLES | P | $R_1$ mm | K | A | B | C | D | $R_2$ mm | E mm | D mm | D′ mm |
|---|---|---|---|---|---|---|---|---|---|---|---|
| I | 2.25 | 106.095 | −0.924824 | $-1.16656 \times 10^{-7}$ | $1.16766 \times 10^{-12}$ | $1.49671 \times 10^{-15}$ | $2.56705 \times 10^{-19}$ | 198.2331 | 3.97 | 75 | 75 |
| II | 3.25 | 92.833 | −0.995874 | $-1.95845 \times 10^{-7}$ | $5.54237 \times 10^{-13}$ | $-7.61801 \times 10^{-16}$ | $1.09606 \times 10^{-19}$ | 223.4646 | 5.15 | 75 | 72 |
| III | 4.25 | 82.519 | −0.8784 | $-2.25472 \times 10^{-7}$ | $1.38271 \times 10^{-12}$ | $-7.4423 \times 10^{-16}$ | $4.23937 \times 10^{-20}$ | 253.8717 | 6.38 | 75 | 68 |
| IV | 5.25 | 74.267 | −0.852831 | $-2.27437 \times 10^{-7}$ | $1.95523 \times 10^{-12}$ | $-8.0536 \times 10^{-16}$ | $9.06195 \times 10^{-21}$ | 291.922 | 7.37 | 75 | 64 |
| V | 6 | 67.515 | −0.0564296 | $-3.4264 \times 10^{-7}$ | $-2.71822 \times 10^{-10}$ | $3.0696 \times 10^{-14}$ | $-6.48049 \times 10^{-17}$ | 293.9796 | 7.76 | 75 | 60 |
| VI | 7 | 61.889 | −0.0428316 | $-4.15961 \times 10^{-7}$ | $-3.71077 \times 10^{-10}$ | $2.15966 \times 10^{-14}$ | $-9.28458 \times 10^{-17}$ | 344.9656 | 8.14 | 75 | 56 |
| VII | 7.75 | 57.128 | −0.031715 | $-4.77966 \times 10^{-7}$ | $-4.64813 \times 10^{-10}$ | $8.91197 \times 10^{-15}$ | $-1.2503 \times 10^{-16}$ | 344.4323 | 8.37 | 75 | 52 |
| VIII | 8.75 | 53.048 | −0.0245499 | $-5.43749 \times 10^{-7}$ | $-5.74955 \times 10^{-10}$ | $-1.6195 \times 10^{-14}$ | $1.72369 \times 10^{-16}$ | 416.672 | 8.39 | 75 | 48 |

$$X = \frac{Y^2/R_1}{1 + \sqrt{1 - (K+1) Y^2/R_1^2}} + AY^4 + BY^6 + CY^8 + DY^{10}$$

in which:

$R_1$ is the radius in millimeters of the basic spherical surface, and

K, A, B, C and D are numerical coefficients.

To correct aberrations of the optically active area 10 it is therefore a relatively simple matter to comply with an optimization program providing for inclusion of all the required merit functions.

The front surface 15 of the merging area 12 is preferably a concave parabolic surface merging tangentially with the front surface 14 of the optically active area 10 along a circumference L of diameter $D_1$.

Figure 1:
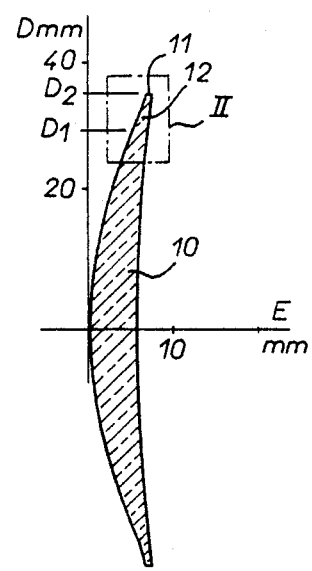
FIG. 1 is a view in axial cross-section of an ophthalmic lens in accordance with the invention.
Figure 2:
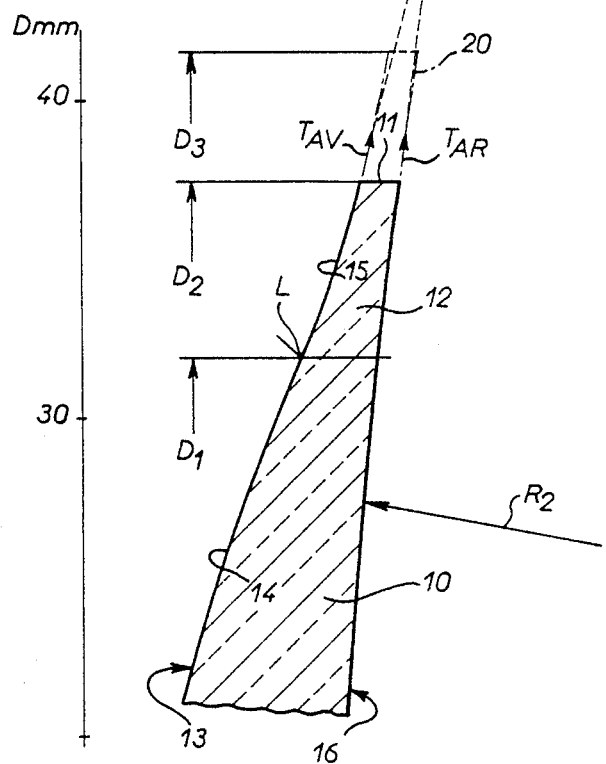
FIG. 2 shows to a larger scale the detail of this ophthalmic lens indicated by a box II in FIG. 1.

In the axial cross-section of FIGS. 1 and 2 the circumference L thus corresponds to the point of inflexion on the corresponding curve.

Satisfactory results are obtained if this parabolic surface satisfies the following parametric equations:

$$X = E.U^2 + F.U + G$$

$$Y = M.U^2 + I.U + J$$

in which E, F, G, H, I and J are numerical coefficients.

The rear surface 16 of the ophthalmic lens in accordance with the invention is a spherical surface of radius $R_2$.

Other surfaces, for example a toroidal surface, may be equally suitable, however.

A number of numerical examples of ophthalmic lenses in accordance with the invention are given in tables T1 and T2 hereinafter by way of non-limiting example.

Table T1 groups together the numerical coefficients for the aspherical front surface 14 of the optically active area 10 of these ophthalmic lenses, their power characteristics and their geometrical characteristics, including in particular their thickness E at the center expressed in millimeters.

Table T2 groups together the numerical coefficients relating to the front surface 15 of the merging area 12 of these ophthalmic lenses.

TABLE T2

| EXAMPLES | E | F | G | H | I | J |
|---|---|---|---|---|---|---|
| I | | | | | | |
| II | −0.309483 | 1.905399 | 6.651873 | 0.0745926 | 5.425408 | 36 |
| III | −0.539987 | 2.815268 | 6.740563 | 0.110618 | 7.389382 | 34 |
| IV | −0.81152 | 3.673589 | 6.704529 | 0.479576 | 9.020424 | 32 |
| V | −1.361213 | 4.793299 | 6.51459 | −0.231704 | 11.73171 | 30 |
| VI | −1.861118 | 5.546417 | 6.225033 | 0.363235 | 13.13677 | 28 |
| VII | −2.3907 | 6.688336 | 5.869499 | 0.1619757 | 15.33802 | 26 |
| VIII | −3.17827 | 7.534674 | 5.428029 | 0.4928589 | 17.00714 | 24 |

In example I there is no merging area 12, the diameter $D_1$ of the optically active area 10 of the corresponding ophthalmic lens being equal to the diameter $D_2$ of its geometrical contour.

In other words, in example I the properly corrected optically active area 10 of the ophthalmic lens in accordance with the invention extends over all its surface. Example IV corresponds to the embodiment shown in FIGS. 1 and 2.

Note, however, that in all cases the diameter $D_2$ of the geometrical contour 11 of the ophthalmic lens in accordance with the invention is significantly greater than 70 mm, being equal to 75 mm.

It will be noted that in tables T1 and T2 the power P varies in steps.

The corresponding steps are marked on the figure 3 diagram.

The straight line R substantially intersects these various steps.

In other words, it materializes their median line.

The examples set out in tables T1 and T2 correspond to ophthalmic lenses the material of which has a refractive index N equal to 1.5.

This is the refractive index of diglycol allyl carbonate and for this reason ophthalmic lenses in accordance with the invention are preferably molded from this material.

Obviously, however, a material with a different refractive index could be used, for example a higher refractive index, specifically a refractive index equal to 1.56.

In this case the same molds can be used for the front surface of these ophthalmic lenses as are used for the front surface of ophthalmic lenses the material of which has a refractive index of 1.5, only the molds corresponding to their rear surface having to be different.

The only result of this is an upward shift in the range of powers.

In the foregoing description the geometrical contour 11 is that of the ophthalmic lens in accordance with the invention after it is trimmed subsequent to molding.

As schematically represented in dashed outline in FIG. 2 the ophthalmic lens is molded in the usual way with an additional annular area 20 of diameter $D_3$ adapted to have the seal used for molding bear on it.

For the corresponding two molds to bear at this location on this seal it is preferable, as shown here, for the tangents $T_{AV}$ to the front surface 13 and $T_{AR}$ to the rear surface 16 of the ophthalmic lens along its geometrical contour 11 to intersect radially beyond the geometrical contour 11.

The numerical examples given in tables T1 and T2 advantageously meet this requirement.

The present invention is obviously not limited to these numerical examples, however, but encompasses any variant execution thereof.

There is claimed:

1. Positive power ophthalmic lens having a central optically active area the diameter of which is at most equal to the diameter of the contour and an optional peripheral merging area around said central optically active area and between it and said geometrical contour, in which lens the diameter $D_1$ in millimeters of said central optically active area is related to the power P of the lens in diopters by a general equation of the type:

$$D_1 = a - b.P$$

where a is a numerical parameter taking a value between 84 and 89 and b is a numerical parameter taking a value between 4 and 4.9.

2. Ophthalmic lens according to claim 1 wherein a takes the value 86.5 and b takes the value 4.4.

3. Ophthalmic lens according to claim 1 wherein said optically active area has an aspherical front surface.

4. Ophthalmic lens according to claim 1 wherein said merging area has a concave parabolic surface.

5. Ophthalmic lens according to claim 1 wherein tangents to its front and rear surfaces along its geometrical contour intersect radially beyond said geometrical contour.

* * * * *